US008661456B2

(12) United States Patent
Wang et al.

(10) Patent No.: US 8,661,456 B2
(45) Date of Patent: Feb. 25, 2014

(54) EXTENDABLE EVENT PROCESSING THROUGH SERVICES

(75) Inventors: Yanlin Wang, San Jose, CA (US); Dhiraj Sharan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 13/285,939

(22) Filed: Oct. 31, 2011

(65) Prior Publication Data

US 2012/0311611 A1  Dec. 6, 2012

Related U.S. Application Data

(60) Provisional application No. 61/492,250, filed on Jun. 1, 2011.

(51) Int. Cl.
*G06F 3/00*  (2006.01)

(52) U.S. Cl.
USPC .......................................................... 719/318

(58) Field of Classification Search
USPC .......................................................... 719/318
See application file for complete search history.

(56) References Cited

U.S. PATENT DOCUMENTS

| | | | |
|---|---|---|---|
| 5,590,334 A * | 12/1996 | Saulpaugh et al. | 719/315 |
| 6,377,939 B1 * | 4/2002 | Young | 705/34 |
| 6,529,514 B2 * | 3/2003 | Christie et al. | 370/401 |
| 7,219,239 B1 | 5/2007 | Njemanze et al. | |
| 7,260,844 B1 | 8/2007 | Tidwell et al. | |
| 7,333,999 B1 | 2/2008 | Njemanze | |
| 7,376,969 B1 | 5/2008 | Njemanze et al. | |
| 7,424,742 B1 | 9/2008 | Dash et al. | |
| 7,437,359 B2 | 10/2008 | Aguilar-Macias et al. | |
| 7,509,677 B2 | 3/2009 | Saurabh et al. | |
| 7,565,696 B1 | 7/2009 | Njemanze | |
| 7,607,169 B1 | 10/2009 | Njemanze et al. | |
| 7,644,438 B1 | 1/2010 | Dash et al. | |
| 7,647,632 B1 | 1/2010 | Ward et al. | |
| 7,650,638 B1 | 1/2010 | Njemanze et al. | |
| 7,788,722 B1 | 8/2010 | Njemanze et al. | |
| 7,809,131 B1 | 10/2010 | Njemanze et al. | |
| 7,844,999 B1 | 11/2010 | Aguilar-Macias et al. | |
| 7,861,299 B1 | 12/2010 | Tidwell et al. | |
| 7,899,901 B1 | 3/2011 | Njemanze et al. | |
| 7,908,397 B1 * | 3/2011 | Chen et al. | 709/246 |
| 7,934,252 B2 * | 4/2011 | Chung et al. | 726/14 |
| 8,015,604 B1 | 9/2011 | Tidwell et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2009/0064333 A1 | 3/2009 | Saurabh et al. | |
| 2010/0011031 A1 | 1/2010 | Huang et al. | |
| 2010/0306285 A1 | 12/2010 | Shah et al. | |
| 2011/0066585 A1 | 3/2011 | Subrahmanyam et al. | |
| 2012/0158821 A1 * | 6/2012 | Barros | 709/203 |

OTHER PUBLICATIONS

Brenda M. Michelson, Event-Driven Architecture Overview, Feb. 2, 2006.*

* cited by examiner

*Primary Examiner* — Lechi Troung (57) ABSTRACT

A system for extending event processing through services includes an event process module to process event data according to event processing rules and services. A build-time system provides an interface for adding or modifying services. A service request gateway receives service requests from service consumers and receives event data from event data providers and provides the service requests to a service container module and provides the event data to the event process module. The service container modules invokes services for the service requests.

19 Claims, 5 Drawing Sheets

EXTENDABLE EVENT PROCESSING THROUGH SERVICES

PRIORITY

The present application claims priority to U.S. provisional application Ser. No. 61/492,250, filed Jun. 1, 2011, which is incorporated by reference in its entirety.

BACKGROUND

Network security management is generally concerned with collecting data from network devices that reflects network activity and operation of the devices, and analyzing the data to enhance security. For example, the data that is collected may originate in messages or in entries in log files generated by sources, such as the network devices and applications, which may include firewalls, intrusion detection systems, servers, routers, switches, etc. The data can be analyzed to identify an attack on the network. If the attack is ongoing, a countermeasure can be performed to thwart the attack or mitigate the damage caused by the attack.

Network security management systems however, typically are not extendable to other systems. For example, it is not uncommon for an entity to have many enterprise systems. However, in most instances, these systems are unable to leverage the functionality of the network security management system. For example, if a system administrator is alerted to a network security threat by a network security management system, the system administrator may manually attempt to isolate and stop the threat. However, other enterprise systems may not be able to interact with the network security management system to respond to threats or perform other functions leveraging any processing performed by the network security management system.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

According to an embodiment, a security information and event management (SIEM) system operates on a platform that functions as a service provider to provide services to other systems. The services may be associated with any event processing performed by the SIEM. The platform may have a service orientated architecture.

Figure 1:
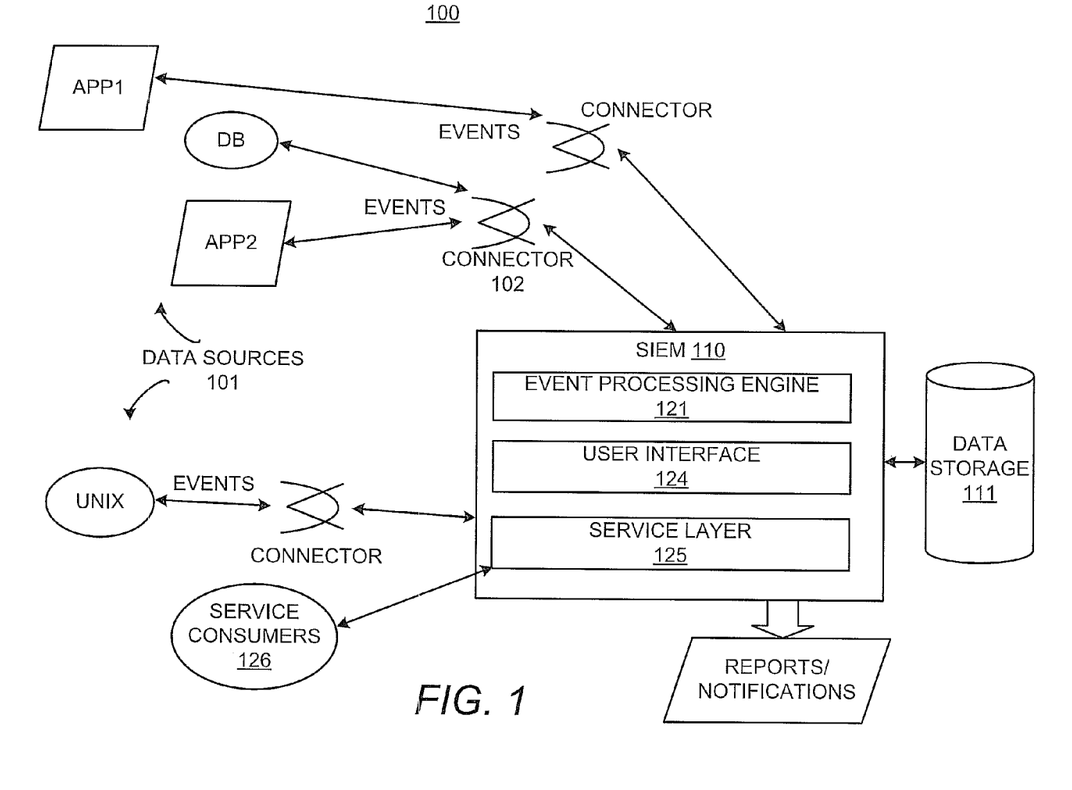
FIG. 1 illustrates an environment including a security information and event management (SIEM) system, according to an embodiment.

FIG. 1 illustrates an environment 100 including an SIEM 110, according to an embodiment. The SIEM 110 is a system that processes event data, which may include real-time event processing. The SIEM 110 may process the event data to determine network-related conditions, such as network security threats. The SIEM 110 is described as a security information and event management system by way of example. As indicated above, the system 110 is an information and event management system, and it may perform event data processing related to network security as an example. The environment 100 includes data sources 101 generating event data for events, which are collected by the SIEM 110 and stored in the data storage 111. The data storage 111 may include a database or other type of data storage system. The data storage 111 may include memory for performing in-memory processing and/or non-volatile storage for database storage and operations. The data storage 111 stores any data used by the SIEM 110 to correlate and analyze event data.

The data sources 101 may include network devices, applications or other types of data sources operable to provide event data that may be analyzed. Event data may be captured in logs or messages generated by the data sources 101. For example, intrusion detection systems (IDSs), intrusion prevention systems (IPSs), vulnerability assessment tools, firewalls, anti-virus tools, anti-spam tools, encryption tools, and business applications may generate logs describing activities performed by the data source. Event data is retrieved from the logs and stored in the data storage 111. Event data may be provided, for example, by entries in a log file or a syslog server, alerts, alarms, network packets, emails, or notification pages. The data sources 101 may send messages to the SIEM 110 including the event data. The data storage 111 may store any data used by the SIEM 110, including service applications. The data storage 111 may include a database or other data storage systems.

Event data can include information about the source that generated the event and information describing the event. For example, the event data may identify the event as a user login or a credit card transaction. Other information in the event data may include when the event was received from the event source ("receipt time"). The receipt time may be a date/time stamp. The event data may describe the source, such as an event source is a network endpoint identifier (e.g., an IP address or Media Access Control (MAC) address) and/or a description of the source, possibly including information about the product's vendor and version. The data/time stamp, source information and other information may then be used for correlation performed by the event processing engine 121. The event data may include meta data for the event, such as when it took place, where it took place, the user involved, etc.

Examples of the data sources 101 are shown in FIG. 1 as Database (DB), UNIX, App1 and App2. DB and UNIX are systems that include network devices, such as servers, and generate event data. App1 and App2 are applications that generate event data. App1 and App2 may be business applications, such as financial applications for credit card and stock transactions, Information Technology (IT) applications, human resource applications, or any other type of applications.

Other examples of data sources 101 may include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices includes routers and switches. Examples of encryption devices include data security and integrity. Examples of physical security systems include card-key readers, biometrics, burglar alarms, and fire alarms. Other data sources may include data sources that are unrelated to network security.

The connector 102 may include code comprised of machine readable instructions that provide event data from a data source to the SIEM 110. The connector 102 may provide efficient, real-time (or near real-time) local event data capture and filtering from one or more of the data sources 101. The connector 102, for example, collects event data from event logs or messages. The collection of event data is shown as "EVENTS" describing event data from the data sources 101 that is sent to the SIEM 110.

The SIEM 110 collects and analyzes the event data. Events can be cross-correlated with rules to create meta-events. Correlation includes, for example, discovering the relationships between events, inferring the significance of those relationships (e.g., by generating metaevents), prioritizing the events and meta-events, and providing a framework for taking action. The system (one embodiment of which is manifest as machine readable instructions executed by computer hardware such as a processor) enables aggregation, correlation, detection, and investigative tracking of activities. The system also supports response management, ad-hoc query resolution, reporting and replay for forensic analysis, and graphical visualization of network threats and activity. Event processing may identify a data model and may include event processing instructions according to the data model. The data model may be specific to an application, industry, domain, etc.

The SIEM 110 may include modules that perform the functions described herein. Modules may include hardware and/or machine readable instructions. For example, the modules may include an event processing engine 121. The event processing engine 121 processes events according to rules and instructions, which may be stored in the data storage 111. The event processing engine 121, for example, correlates events in accordance with rules, instructions and/or requests. For example, a rule indicates that multiple failed logins from the same user on different machines performed simultaneously or within a short period of time is to generate an alert to a system administrator. Another rule may indicate that two credit card transactions from the same user within the same hour, but from different countries or cities, is an indication of potential fraud. The event processing engine 121 may provide the time, location, and user correlations between multiple events when applying the rules.

The user interface 124 allows users to interact with the SIEM 110. The user interface 124 may include a web-based interface that allows users to view reports and notifications generated from event processing. The service layer 125 makes services available to service consumers 126. Examples of the services may include event queries, event processing reporting and notifications, etc. Services are described in further detail below. The service consumers 126 may include external systems, such as enterprise systems, that can leverage processing performed by the SIEM 110 through consumption of services.

Figure 2:
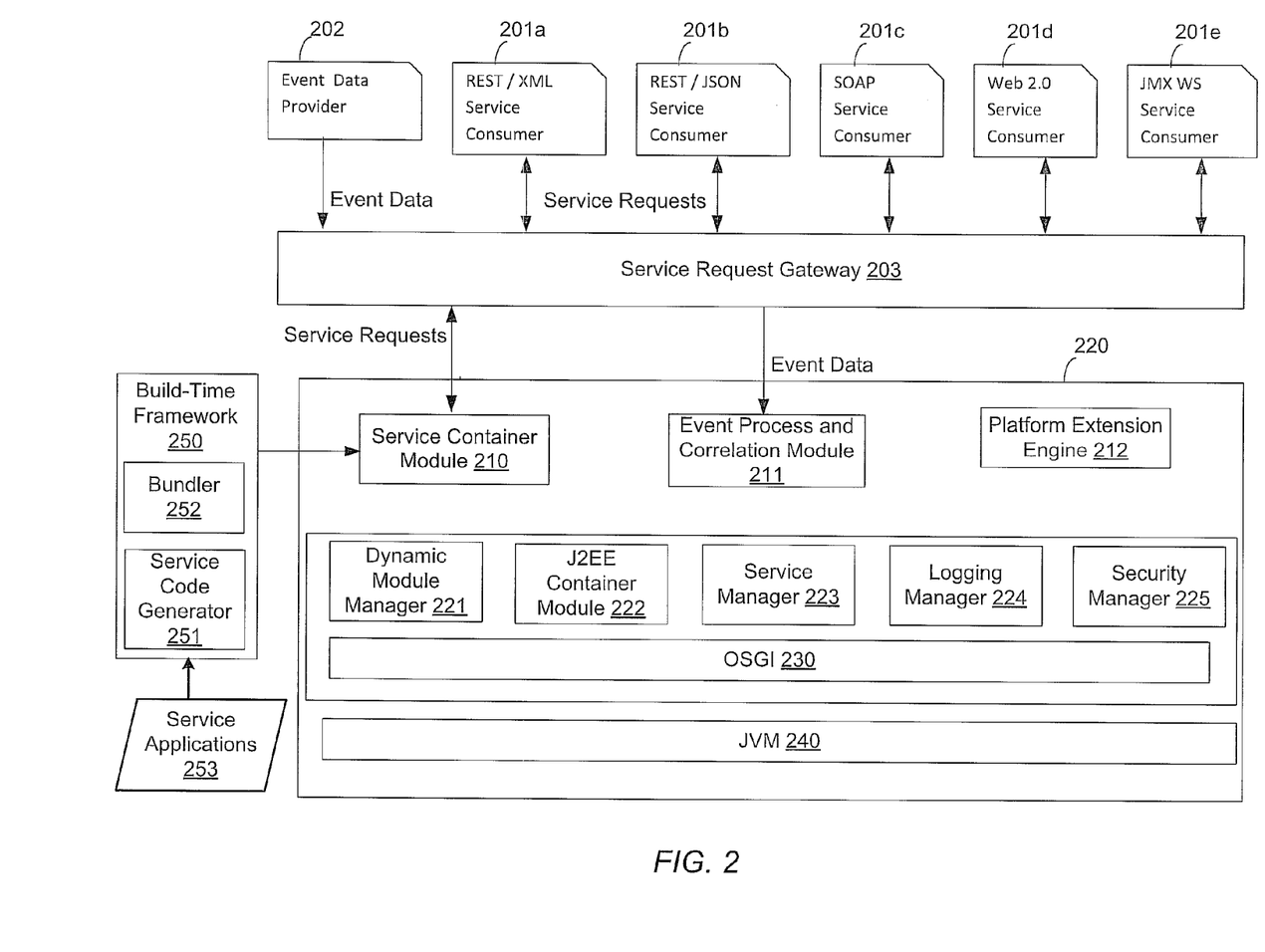
FIG. 2 illustrates an architecture diagram of a platform that may be used for the SIEM, according to an embodiment.

FIG. 2 illustrates an architecture diagram of a platform 200 that may be used for the SIEM 110 according to an embodiment. The architecture of the platform 200 for example includes a service oriented architecture. The platform 200 includes machine readable instructions that execute on computer hardware, such as a processor. Through the service oriented architecture, the platform 200 provides a standard and convenient way to integrate different types of services to enrich the functionality of the service consumers. The platform 200 also provides a modular way to manage the services. Also, the platform 200 can make the service functionalities available to service consumers as services via a service request gateway 203. A service consumer may include an application (e.g., web application), component or other software module that requests a service, for example, from the SIEM 110. A service may comprise a unit of functionality that implements an action. For example, a service may include calculating a fraud score based on event data or calculating a network security threat score based on event data. Another example may include a service to run a query that includes parameters received from a service consumer. A service is comprised of machine readable instructions, such as a JAVA, that is provided to the SIEM 110, for example, by a developer, as a service application. The SIEM 110 makes the service discoverable to service consumers by listing the service in a service registry and can deploy the service as needed so it is consumable by service consumers.

Examples of service consumers are shown as 201a-e in FIG. 2. The service consumers 126 shown in FIG. 1 may include the service consumers 201a-e shown in FIG. 2. The service consumers 201a-e may communicate with the platform 200 to make service requests. The service consumers 201a-e may use different service bindings to communicate with the platform 200. A service binding may specify the protocol and data format to be used to communicate between the service consumer and the service provider. Service bindings may comprise different web services used by the service consumers 201a-e to communicate service requests to the platform 200. For example, consumer 201a may use a Representational State Transfer (REST)/Extensible Markup Language (XML) web service; consumer 201b may use a REST/ JavaScript Object Notation (JSON) web service; consumer 201c may use a Simple Object Access Protocol (SOAP) web service, consumer 201d may use Web 2.0; and consumer 201e may use a Java Management Extensions (JMX) web service.

Event data providers 202 provide event data to the platform 200 via the service request gateway 203. The event data provider 202 may include the data sources 101 and connectors 102 supplying event data to the SIEM 110, as shown in FIG. 1. The event data provider 202 may also send data models to the platform 200 via the service request gateway 203. A data model may include a schema or some kind of data structure for storing different types of data, such as industry specific data, application specific data, etc. Data models may be used for event processing of the event data stored in the data models. Event data may be provided to the platform 200 in batches and stored in the data storage 111, and the event data is processed by the event process and correlation module 211. Also, data models may be sent to the platform 200 from connectors or other data sources and stored in the data storage 111.

The service request gateway 203 communicates with the service consumers 201a-e and the event data providers 202, for example, via one or more web services. The service request gateway 203 may provide secure communications. For example, the service request gateway 203 may comprise a secure web server which is compliant with the Federal Information Processing Standard (FIPS) 140-2 and Suite B transitional profile encryption standards. The service request gateway 203 is not shown as included in the platform 200 but it can reside on the platform 200 or be separate. The service request gateway 203 may be provided in a web server that is connected via a network to the platform 200 or they all may reside on the same server.

The service request gateway 203 manages and forwards service requests and event data and data models that it receives from the service consumers 201a-e and event data provider 201. The service request gateway 203 may include a single network interface or a single port to receive service requests and event data and data models. The service request gateway 203 determines whether the data it receives is a service request or event data or a data model, and forwards the data to the appropriate module in the platform 200 for processing. The service request gateway 203 may include meta data with the forwarded data, which may identify a context for a service request, sent to the appropriate module in the platform 200. Context may also include information that pertains to what has and is transpiring as part of a current service activity. Consumer-specific context may be exchanged between the provider and the consumer. The context may be used to keep track of which service consumer is making the service request since many consumers are making requests periodically.

The service request gateway 203 may identify information in the Hypertext Transfer Protocol (HTTP) header to determine whether received data is a service request or event data/data model. For example, a service consumer may include information in a predetermined field of the header to identify the data as a service request. The information may also include context information for the service. Similarly, an event data provider may include information in a field to identify the data as event data or a data model.

The service request gateway 203 sends service requests to the service container module 210 and forwards responses to service requests from the service container module 210 back to the service consumer. Also, the service request gateway 203 sends event data or data models to the event process and correlation module 211.

In one example, service consumer 201a sends an XML service request to run a query on event data. The service request gateway 203 identifies the request as a service request, for example through information in the header, and passes the service request to the service container module 210. The service container module 210 identifies the service to call by the service request. In this case it is a service executed by the event process and correlation module 211 to run the query. The service request may include an ID or description of the service to call which is determined from a service registry stored at the platform 200. The service registry stores information about each of the service offered by the platform 200 and service consumers can search the registry for services they desire to consume. A service identified from the registry may be requested from a service request sent to the service container module 210. The service is invoked by the service container module 210, which may include executing a service call to run the service which in this example runs the query. Query results are provided back to the service container module 210. The service container module 210 sends the response to the service consumer 201a.

The service layer 125 shown in FIG. 1 may include the service request gateway 203, module core framework 220 and/or build-time framework 250 shown in FIG. 2. The event process and correlation module 211 may be included in the event processing engine 121 shown in FIG. 1. The event process and correlation module 211 may process and correlate events according to stored rules in real-time or in non-real time.

The service container module 210 exposes services to the service consumers 201a-e. As described above, the service container module 210 receives the service requests from the service consumers 201a-e via the service request gateway 203. Also, the service container 210 provides responses for service requests to the service consumers 201a-e via the service request gateway 203. For example, the service container module 210 receives service requests from the service request gateway 203. The service container module 210 may also provide a service registry to a service consumer. Also, the service container module 210 can implement a service call provided in a service request to invoke a desired service.

The service container module 210 may have dependencies to the event process and correlation module 211 and the modules in the module core framework 220. For example, if a consumer tries to invoke a service, the service container module 210 may have to verify the service call is coming from a user that is authenticated and has privileges to access the service. The service container module 210 may delegate that functionality to modules in the module core framework 220. Similarly, the service container module 210 may have access to event processing services provided by the event process and correlation module 211. The service container module 210 may pass context with the service call to invoke the service for the specific consumer. Also, responses to the service requests are sent back to the consumer.

The service container module 210 may expose some event workflow management controls as management services that can be consumed by the service consumers. A service consumer may control event process workflow by consuming an event processing workflow control service. An event processing workflow control service may manage the order of processing events. For example, through a management service binding, a service consumer can control if events are persisted event processing by the event processing engine 121 or vice versa based on the nature of the event stream. Another example is a service consumer can opt in or opt out of certain event processing stages. For example, for certain event streams, the persistence stage can be opted out. Also, the service container module 210 may expose event correlation controls as management services so a service consumer can manage correlation. These type of services are referred as event control correlation services. For example, for a certain event stream, the event time for the events in the stream may be in a disordered state. The service consumer may have knowledge of this kind of event stream, so by consuming event correlation services, the service consumer can dynamically give instruction that an event stream including events with a certain tag needs to be buffered and then sorted by event time before passing to event processing and correlation. Also, statistic event data may be automatically exposed into a service. A user can define the statistics, such as top N attacker addresses, top loaded connector, etc. A service consumer may consume a service provided by the service container module 210 that provides the statistics to the service consumer. The external system of the service consumer may perform actions based on the statistics, such as ban top 5 attacker addresses from having access to the system or reducing a data feed to a top-loaded connector.

The module framework 220 may include an application server that provides service management, module management and service application modular capabilities, security and logging. The dynamic module manager 221 provides lifecycle management which may include installing, running, and removing services. Developers may create service applications and provide the service applications to the SIEM 110. The service applications are stored in the data storage 111 and then further managed by the dynamic module manager 221. For example, as performed by the dynamic module manager 221, the service applications are installed and executed when needed or requested and may be subsequently removed from the SIEM 110 but maintained in the data storage 111. The versioning may include tracking versions and running the most recent version or a requested version.

The platform provides a way to integrate services, which may include Java 2 Platform or Enterprise Edition (J2E or J2EE) applications, into the SIEM. The J2EE container dynamic module 222 runs J2EE applications in a container. The container implements a web component contract for J2EE components. The container specifies a runtime environment for application components, and provides an interface between the components and the low-level platform-specific functionality. For example, a J2EE container provides deployment, management and execution support for application components, and the low-level details may be specified in XML descriptor files.

The service manager 223 monitors service lifecycle. For example, services are loaded and unloaded and are started and stopped as needed. A service stop may impact a dependency. For example, a service may require running multiple services to perform various functions for the service. The service manager 223 keeps track of the dependencies and may control lifecycle so as not to negatively impact a dependency by stopping a needed service.

The logging manager 224 logs activities of the module core framework 220 and the security manager 225 extends security functionality so any security provider that implements the security provider interface of the security manager 225 can achieve authentication.

The module core framework 220 runs on Open Services Gateway Initiative (OSGI) 230. The OSGI 230 is a module system and service platform for Java that implements a complete and dynamic component model. The specification for implementing the OSGI 230 is made available through the OSGI standard. The platform 200 may run on Java Virtual Machine (JVM) 240, which runs on an operating system and computer hardware.

The build-time framework 250 incorporates services into the SIEM 110. The build-time framework 250 provides an interface for adding or modifying services. For example, service applications 253 are provided to the build-time framework 250. A service application is machine readable instructions providing the functionality of the service, such as a JAVA application which may be used to generate a J2EE application. A service application can be any plain old java object (pojo) annotated with service annotations indicating service bindings. Service code generator 251 and bundler 252 expose a service application to a plurality of different service bindings, which may include the different web services used by the service consumers 201*a-e*. For example, a service application for a new service is received. The service code generator 251 and bundler 252 create a service application that has adaptors for different service bindings. The service application and adaptors are bundled. The bundle may be provided as JAR file and stored in the data storage 111. The bundle includes service metadata such as version, status, relationships (dependencies between services and service depends on multiple libraries), service bindings, and other information that govern the service usage. The service is published in the service registry and can be consumed using any of the service bindings. When the service application is provided to the build-time framework, a user may indicate the service bindings to create for the service application. For example, one service application may have REST service bindings while another service application may have SOAP and Web 2.0 service bindings. The service bindings are included as metadata in the bundle.

The output of the build-timeframe framework 250, as indicated above, may include a bundle including the service application and its bindings. The service application is exposed to the service consumers 201*a-e* by the service container module 210. After a service is built by the build-time framework 250, the service container module 210 may include the service in the service registry and may run the service per requests from the service consumers 201*a-e*.

Figure 3:
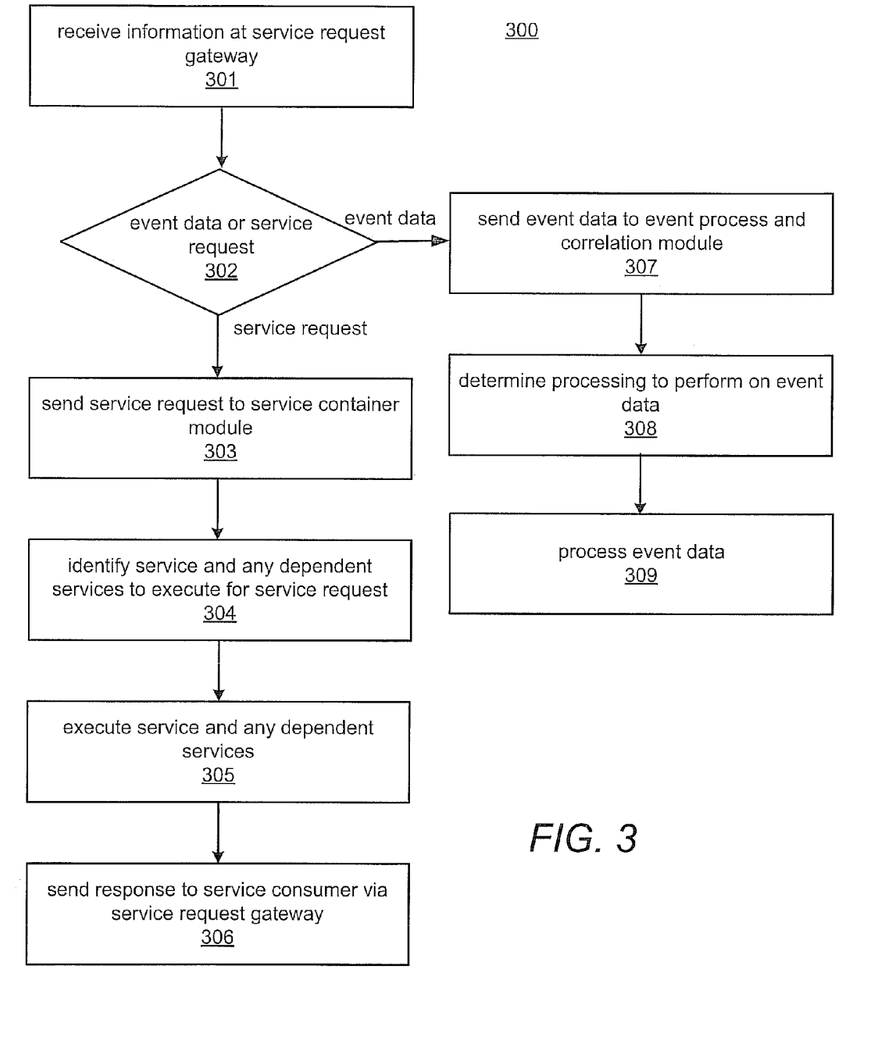
FIG. 3 illustrates a method, according to an embodiment.

FIG. 3 illustrates a method 300 for processing information through the service request gateway 203 and the platform 200. At 301, information is received at the service request gateway 203. The information may be a service request from a service consumer or event data from an event data provider.

At 302, the service request gateway 203 determines whether the information is event data or a service request. Header information in the HTTP request may be used to identify whether the information is a service request or event data.

At 303, if the information is a service request, the service request gateway 203 sends the service request to the service container module 210.

At 304, the service container module 210 uses information from the service request to identify the service and any dependent services to execute from the service registry. For example, the service request may include an identifier that is used to identify the service from the service registry. The service description in the registry may identify any dependent services that are needed for the service. For example, the service may require a privilege service to run to determine if the service consumer has privileges to use the requested service.

Also, the service container module 210 determines if a service request is a synchronous or an asynchronous service request. The service request may indicate if it is synchronous or asynchronous through metadata in the request. If the service request is asynchronous, then the service container module queues the service request for processing and sends an acknowledgment back to the service consumer making the request via the service request gateway 203. The acknowledgment indicates that service request is received for processing and may include a reference ID that may be used to request status of the service processing. If the service request is synchronous, the service request is queued for processing but no acknowledgement is sent.

At 305, the service and any dependent services are executed. For example, the module core framework 220 starts the services in containers if they are not already running. The services are performed. For example, if the service is to run a query on event data, the query is executed by the event process and correlation module 211.

At 306, a response to the service request, e.g., including results of executing the service, are sent to the service consumer via the service request gateway 203.

At 307, if the information is determined to be event data at 202, then the event data is sent to the event process and correlation module 211.

At 308, the event process and correlation module 211 determines the processing to be performed on the event data. The processing may be predetermined based on the type of event data. For example, network security data may be processed differently than bank transactions to detect network security events and fraud. At 309, the event data is processed. Processing of event data is further described below with respect to the method 500.

Figure 4:
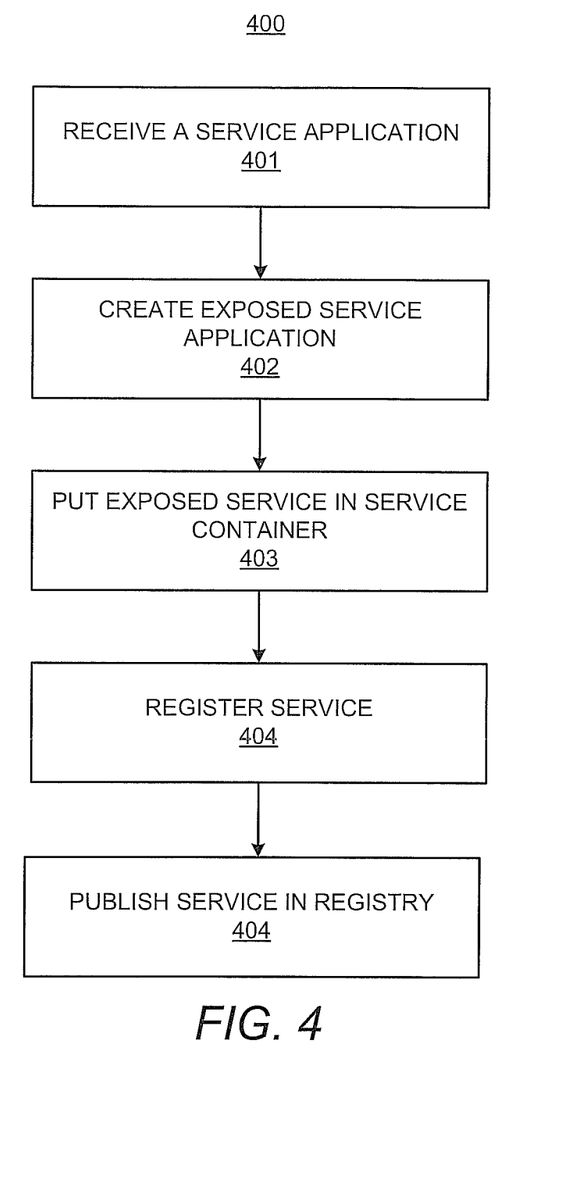
FIG. 4 illustrates a method, according to an embodiment.

FIG. 4 illustrates a method 400 for installing a service application at build time, according to an embodiment. At 401, a service application for a new service is received at the build-time framework 250 shown in FIG. 2. For example, a developer creates the service application, for example in any computer language and compiles it into JAVA byte code. The JAVA application may be sent to the SIEM 110.

At 402, the service code generator 251 shown in FIG. 2 creates an exposed service application including adaptors for different service bindings. The service bindings may be specified by a user.

At 403, the bundler 252 puts the exposed service in a service container. The service container includes service metadata such as version, status, relationships (dependencies between services and service depends on multiple libraries), service bindings, and other information that govern the service usage.

At 404, the module core framework 220 registers the service.

At 405, the module core framework 220 publishes the service including a service ID and description in the service registry.

Figure 5:
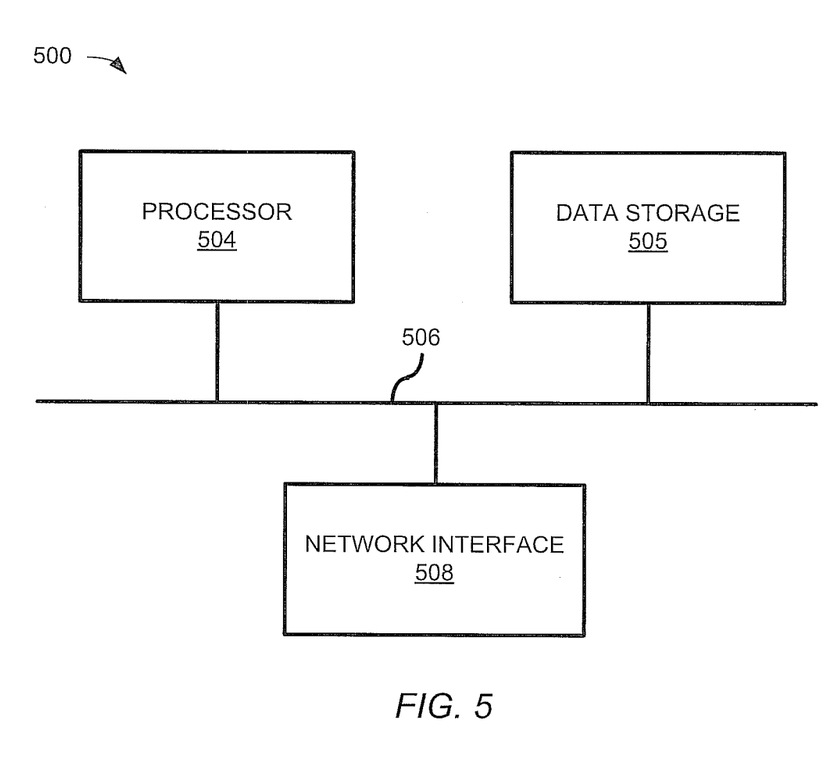
FIG. 5 illustrates a computer system that may be used for the methods and system, according to an embodiment.

FIG. 5 shows a computer system 500 that may be used with the embodiments described herein. The computer system 500 includes components that may be in a server or another computer system. The computer system 500 may be used to host the SIEM 110 and be used for the platform 200. The computer system 500 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 includes a processor 504 or other hardware processing circuit that may implement or execute machine readable instructions performing some or all of the methods, functions and other processes described herein. Commands and data from the processor 504 are communicated over a communication bus 506. The computer system 500 also includes data storage 505, such as random access memory (RAM) or another type of data storage, where the machine readable instructions and data for the processor 504 may reside during runtime. Network interface 508 sends and receives data from a network. The computer system 500 may include other components not shown.

While the embodiments have been described with reference to examples, various modifications to the described embodiments may be made without departing from the scope of the claimed embodiments.

What is claimed is:

1. A system for extending event processing through services, the system comprising:
at least one processor;
an event process module, executed by the at least one processor, to process event data according to event processing rules and by services provided by service applications;
a build-time system, executed by the at least one processor, to provide an interface for adding or modifying the services provided by the service applications;
a service request gateway, executed by the at least one processor, to receive service requests from service consumers and to receive the event data from event data providers and to provide the service requests to a service container module and to provide the event data to the event process module, and
the service container module, executed by the at least one processor, to invoke the services responsive to receiving the service requests from the service request gateway, wherein the service container module is to determine if a service request of the service requests is an asynchronous service request or a synchronous request, and
if the service request is an asynchronous service request, send an acknowledgment to a service consumer of the service consumers sending the service request, wherein the acknowledgement comprises a reference ID for making a status request about service execution, and if the service request is a synchronous service request, process the service request without sending the acknowledgment to the service consumer.

2. The system of claim 1, comprising a service code generator to receive the service applications and to generate exposed service applications that are each exposed to a plurality of different service bindings.

3. The system of claim 2, wherein the exposed service applications include adaptors to provide a service using any of the plurality of different service bindings.

4. The system of claim 2, wherein the service applications comprise plain old java object service applications and are annotated with service annotations, wherein the service annotations include an indication of the service bindings to use for each of the service applications.

5. The system of claim 1, wherein the service request gateway comprises a single port to receive the service requests and the event data.

6. The system of claim 1, wherein the service request gateway is to receive a Hypertext Transfer Protocol request, and determine if information in the request is one of the service requests or the event data based on header information in the request.

7. The system of claim 6, wherein the service request gateway is to send context for a service consumer to the service container module if the request is determined to be a service request, wherein the context is used to keep track of which service consumer is making the service request.

8. The system of claim 1, wherein for each service request the service container module is to call a service identified from the service request to execute the service.

9. The system of claim 1, wherein a service for one of the service requests is executed by the event process module.

10. The system of claim 1, comprising:
a plurality of modules in a module core framework to provide lifecycle management of services, dependency management of services, container management for services, logging activities in the system and user authentication.

11. The system of claim 1, wherein the service container module exposes event processing workflow control services and event control correlation services as services consumable by the service consumers.

12. The system of claim 1, wherein the service container module exposes a service consumable by the service consumers, wherein the service provides statistics for the event data, wherein external systems of the service consumers are to perform actions based on the statistics.

13. A method comprising:
receiving information at a service request gateway;
determining whether the information is event data or a service request;

if the information is event data, sending the event data to an event process module in a platform to process the event data according to event processing rules;

if the information is a service request, sending the service request to a service container module in the platform, and determining context data and a service to call for the service request;

determining, by the service container module, if the service request is an asynchronous service request or a synchronous request;

if the service request is an asynchronous service request, sending an acknowledgment to a service consumer sending the service request, wherein the acknowledgement comprises a reference ID for making a status request about service execution; and     if the service request is a synchronous service request, processing the service request without sending the acknowledgment to the service consumer;

executing the service, by a processor, in the platform; and sending results of executing the service from the service container module to a service container via the service request gateway.

14. The method of claim 13, wherein executing the service comprises:

determining whether the service has a dependency to another service; and     executing the service and the another service if the service has the dependency to another service.

15. The method of claim 14, comprising:

invoking lifecycle management to start the service and the another service to be executed and to stop the service and the another service if no other currently executing service is dependent on the service and the another service.

16. The method of claim 13, comprising:

receiving a service application; and generate an exposed service application that is exposed to a plurality of different service bindings, wherein the exposed service application includes adaptors to provide a service using any of the plurality of different service bindings.

17. At least one non-transitory computer readable medium storing machine readable instructions that when executed perform instructions to:

receive information at a service request gateway;

determine whether the information is event data or a service request;

if the information is event data, send the event data to an event process module in a platform to process the event data according to predetermined services;

if the information is a service request, send the service request to a service container module in the platform, and determine context data and a service to call for the request;

determine, by the service container module, if the service request is an asynchronous service request or a synchronous request;

if the service request is an asynchronous service request, send an acknowledgment to a service consumer sending the service request, wherein the acknowledgement comprises a reference ID for making a status request about service execution; and     if the service request is a synchronous service request, process the service request without sending the acknowledgment to the service consumer;

execute the service in the platform; and send results of executing the service from the service container module to a service container via the service request gateway.

18. The at least one non-transitory computer readable medium of claim 17, wherein instructions to execute the service comprise instructions to:

determine whether the service has a dependency to another service; and execute the service and the another service if the service has the dependency to another service.

19. The at least one non-transitory computer readable medium of claim 17, wherein the instructions comprise instructions to:

receive a service application; and generate an exposed service application that is exposed to a plurality of different service bindings, wherein the exposed service application includes adaptors to provide a service using any of the plurality of different service bindings.

\* \* \* \* \*